(12) United States Patent
Chartouni et al.

(10) Patent No.: US 8,742,876 B2
(45) Date of Patent: Jun. 3, 2014

(54) TRANSFORMER COIL AND TRANSFORMER WITH PASSIVE COOLING

(75) Inventors: Daniel Chartouni, Wettingen (CH); Rafael Murillo, Zaragoza (ES); Tilo Bühler, Wettingen (CH)

(73) Assignee: ABB Technology AG, Zurich (CH)

( * ) Notice: Subject to any disclaimer, the term of this patent is extended or adjusted under 35 U.S.C. 154(b) by 46 days.

(21) Appl. No.: 13/311,144

(22) Filed: Dec. 5, 2011

(65) Prior Publication Data
US 2012/0092109 A1   Apr. 19, 2012

Related U.S. Application Data

(63) Continuation of application No. PCT/EP2010/057322, filed on May 27, 2010.

(30) Foreign Application Priority Data

Jun. 5, 2009 (EP) .................................... 09161988

(51) Int. Cl.
*H01F 27/08* (2006.01)
*H01F 27/10* (2006.01)
*H01F 27/02* (2006.01)

(52) U.S. Cl.
USPC ............... 336/55; 336/57; 336/58; 336/60; 336/94

(58) Field of Classification Search
CPC ................................................ F05B 2260/208
USPC ............................................. 336/55, 57, 58
See application file for complete search history.

(56) References Cited

U.S. PATENT DOCUMENTS

| 3,164,666 | A | * | 1/1965 | Camilli | ............... 174/17 R |
|---|---|---|---|---|---|
| 4,129,845 | A | | 12/1978 | Benke | |
| 5,656,984 | A | | 8/1997 | Paradis et al. | |
| 6,147,580 | A | | 11/2000 | Rettew et al. | |
| 6,368,530 | B1 | | 4/2002 | Adubato et al. | |
| 2007/0247266 | A1 | | 10/2007 | Yargole et al. | |

FOREIGN PATENT DOCUMENTS

| GB | 764 576 A | 12/1956 |
|---|---|---|
| JP | 6-215959 A | 8/1994 |
| WO | WO 2006/016377 A1 | 2/2006 |

OTHER PUBLICATIONS

International Search Report (PCT/ISA/210) issued on Jul. 26, 2010, by European Patent Office as the International Searching Authority for International Application No. PCT/EP2010/057322.

(Continued)

*Primary Examiner* — Alexander Talpalatski
*Assistant Examiner* — Ronald Hinson
(74) *Attorney, Agent, or Firm* — Buchanan Ingersoll & Rooney PC

(57) ABSTRACT

The disclosure relates to a transformer coil which can be cooled by a heat pipe and has a primary winding and a secondary winding and relates to a transformer which is formed from transformer coils which can be cooled in this way. The heat from the transformer coil is dissipated by the heat pipe. The evaporator of the heat pipe is arranged in the area of the windings and forms at least one extensive evaporator segment, which extends in the circumferential direction of the windings and along the winding axis of the transformer coil and in the process covers a multiplicity of the turns of the secondary winding.

19 Claims, 4 Drawing Sheets

(56) References Cited

OTHER PUBLICATIONS

Written Opinion (PCT/ISA/237) issued on Jul. 26, 2010, by European Patent Office as the International Searching Authority for International Application No. PCT/EP2010/057322.
Search Report issued on Nov. 27, 2009, by European Patent Office for Application No. 09161988.2.

Notification of Transmittal of Translation of the International Preliminary Report on Patentability (Forms PCT/IB/338 and PCT/IB/373) and the Written Opinion of the International Searching Authority (Form PCT/ISA/237) issued on Dec. 29, 2011, in the corresponding International Application No. PCT/EP2010/057322.

* cited by examiner

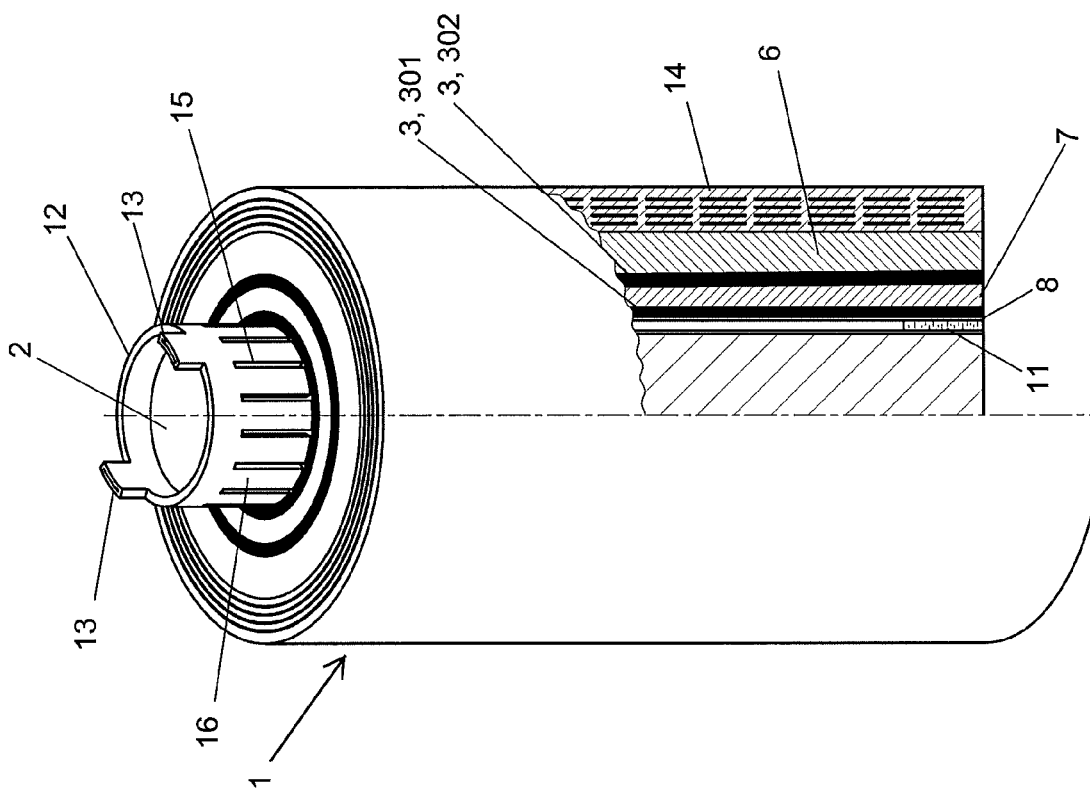
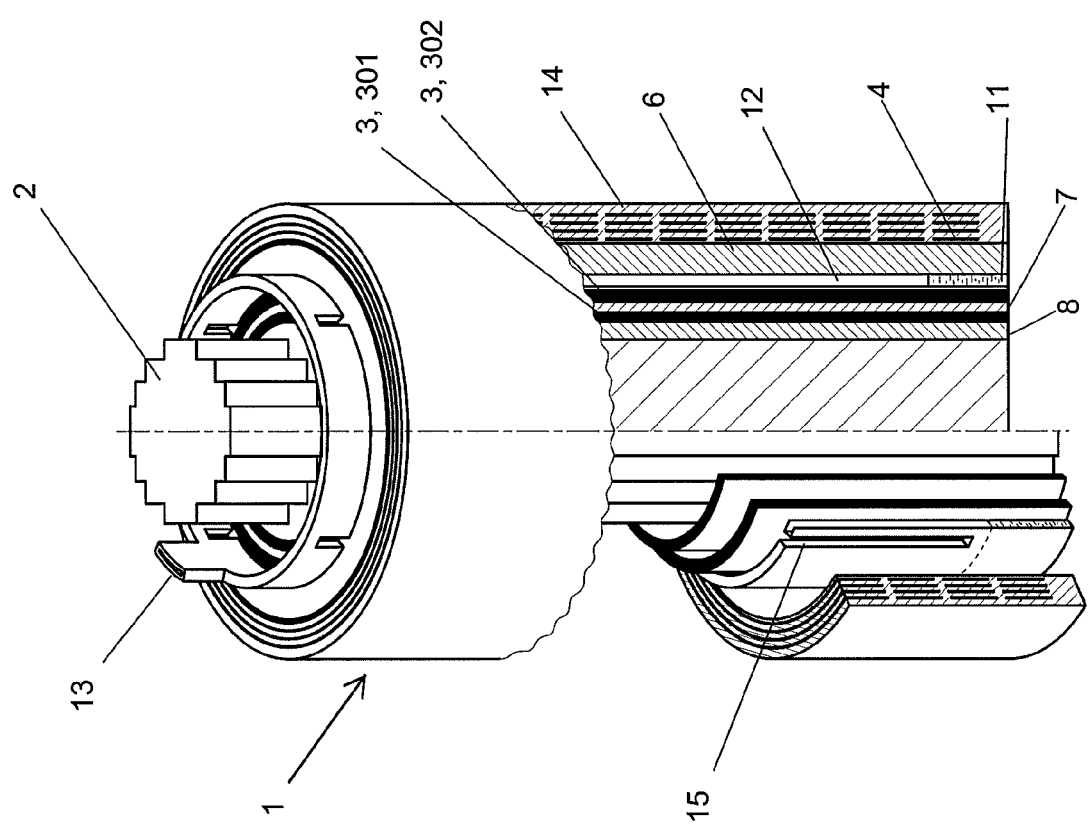
FIG. 2
FIG. 3

TRANSFORMER COIL AND TRANSFORMER WITH PASSIVE COOLING

RELATED APPLICATION(S)

This application claims priority as a continuation application under 35 U.S.C. §120 to PCT/EP2010/057322, which was filed as an International Application on May 27, 2010 designating the U.S., and which claims priority to European Application 09161988.2 filed in Europe on Jun. 5, 2009. The entire contents of these applications are hereby incorporated by reference in their entireties.

FIELD

The present disclosure relates to a transformer coil with a passive cooling device, and to a transformer with at least one such coil, for example, to a resin-encapsulated dry-type transformer with a built-in heat pipe for carrying away heat which is created, and to a method for production of a coolable dry-type transformer, for example, a dry-type.

BACKGROUND INFORMATION

In order to increase performance and operational reliability of transformers, efficient and reliable cooling of transformer components can be desirable. Active cooling systems which use oil, for example, as a cooling medium are known from power transformers which operate in a voltage range, for example, up to 800 kV. Large power transformers can be installed in systems in which a high short-circuit power can occur. The mechanical stress which can occur in short-circuit events can influence the design. Modern power transformers can use oil both for electrical insulation and for cooling. The oil can be actively pumped through the transformer, and heat is extracted from the circuit by heat exchangers.

Distribution transformers can be in the form of oil-filled models, or dry-insulation models. Oil-filled distribution transformers can have primary voltages up to 72.5 kV, while dry transformers, with open or encapsulated turns, can have primary voltages up to 52 kV and can be used where the risk of fire or environmental contamination should be minimized.

The use of fans and transverse air blowers is known for cooling dry transformers. With this type of active forced cooling, air can be blown through channels which are located in the transformer. The channels which are used to guide the air may be, for physical reasons, located only between the windings on a primary side of the transformer coil. Because the turns on a secondary side may be typically wound first in a spiral shape in a radial direction in a plurality of layers and then the next axially adjacent turn is wound in the same wound manner, it can become difficult to provide cooling channels. The secondary side of the dry transformer, which can be encapsulated with epoxy resin, can therefore provide cooling via thermal conduction and convection on the surface of the epoxy resin. The performance of many drive transformers which are cooled in this way can be limited by the operating temperature on the secondary side of the transformer. Active cooling systems may not operate autonomously, and can fail more easily.

Another type of cooling for dry transformers is disclosed in U.S. Pat. No. 5,656,984. There, passive cooling is disclosed, in which four heat pipes are placed close to a transformer core, and primary turns are wound around them. The evaporators for the individual heat pipes are, for this purpose, in the form of thin pipes which run in an elongated form, and run parallel to the winding axis. As a result of the very local and singular arrangement of the heat pipes, for example, in the radial direction of the transformer, the heat which is created and results, for example, from transmission losses and hysteresis, can be extracted in the areas close to the individual heat pipes. The cooling power can therefore to an extent vary locally, and depends on the arrangement of the individual heat pipes in the transformer. This design involves a plurality of heat pipes which, for example, can cool zones close to the transformer core.

U.S. Pat. No. 4,129,845 proposes active transformer cooling in which the transformer to be cooled is sheathed by a container in which a liquid reservoir is also located. A pump conveys the cooling liquid from the reservoir, which is located underneath the transformer, upward, and distributes it above the transformer windings. The cooling liquid which has been distributed in this way flows down between the turns of the transformer, and evaporates.

U.S. Pat. No. 6,368,530 discloses a cylindrical, coolable transformable transformer coil in which four cooling channels are provided between the inner and the outer turns. The cooling channels run in the direction of the rotation axis, and are separated from one another by equal distances.

GB 764576 discloses a coolable transformer which is surrounded by a container which is filled with cooling liquid. The evaporating cooling liquid can rise into the lines, which act as a condenser, can condense there and can flow back.

JP 6215959 discloses a use of heat pipes for passive cooling of transformers. There, a multiplicity of evaporators in the form of rods are placed concentrically and at an axial distance from one another around the transformer core, or run bent in a U-shape in the axial direction between the individual turn layers.

An improved cooling concept to achieve a higher power density in dry transformers is desirable.

SUMMARY

A dry transformer coil is disclosed, comprising: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment.

A dry transformer is disclosed, comprising: a transformer coil, including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment.

A method for production of a coolable, resin-encapsulated dry transformer coil is disclosed including a primary winding and a secondary winding, each of the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment, the method comprising: forming a plurality of turns of the primary winding including alternate layers by winding electrically conductive layer material and electrical insulating material around a winding axis; winding a plurality of the turns of the secondary winding; sheathing the turns by a hollow body composed of deformable material; encapsulating the turns of the secondary winding and of the hollow body by a casting resin for stabilizing a shape of the hollow body arranged as an evaporator; curing the resin, forming a block, including the secondary winding and the hollow body; and arranging of the block, including the secondary winding and the hollow body around the wound primary winding.

A wind power installation is disclosed comprising: a nacelle having encapsulation with a dry transformer having a transformer coil including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment.

A marine vessel is disclosed, comprising: a dry transformer having a transformer coil including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and secondary windings are arranged, wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment, the heat pipe of the transformer having a condenser and the condenser being thermally coupled directly to the marine-vessel's wall or the marine-vessel's bottom.

A train is disclosed, comprising: a dry transformer having a transformer including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms at least one extensive evaporator segment which holds a working medium, extends in a circumferential direction of the windings and along the winding axis and covers a plurality of the turns of the secondary winding, the evaporator segment being closed in a bottom area and being in a form of an annular cylindrical vessel, the evaporator segment being surrounded by the secondary winding, or the secondary winding being surrounded by the evaporator segment, with the heat pipe having a condenser, the condenser extending outside cladding on the train, and being coolable by a wind of motion.

BRIEF DESCRIPTION OF THE DRAWINGS

FIG. 2 shows a perspective view and a perspective section view of an exemplary embodiment of a transformer coil with a hollow-cylindrical heat pipe which includes four evaporator segments, with the heat pipe being arranged directly on an outermost turn of the primary winding;

FIG. 3 shows a section view of an exemplary embodiment of a transformer coil with a hollow-cylindrical heat pipe which includes a plurality of segments, with the heat pipe being arranged between the core and an innermost turn of the primary winding;

DETAILED DESCRIPTION

Figure 1:
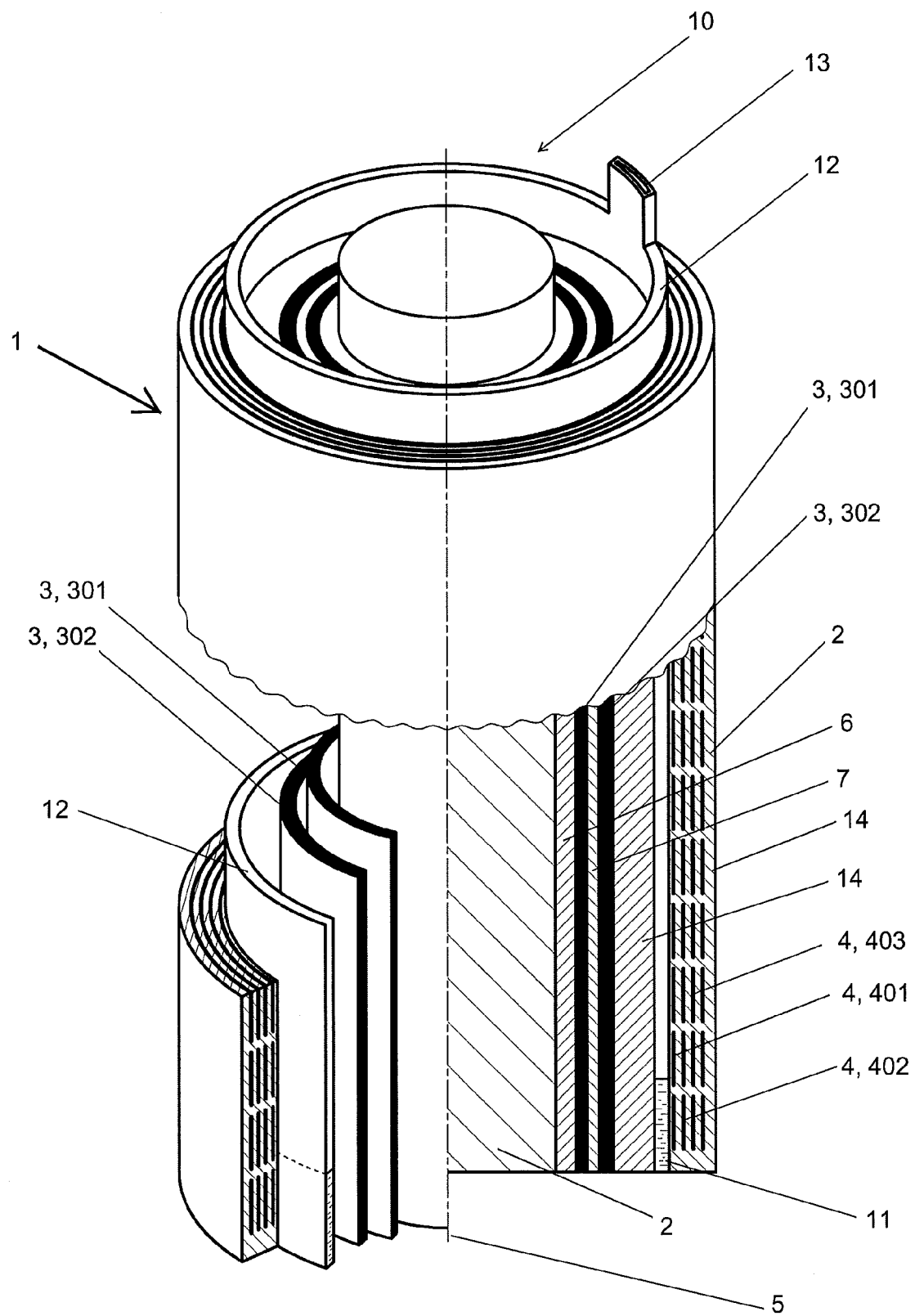
FIG. 1 shows a perspective and section view of an exemplary embodiment of a transformer coil with a heat pipe which is arranged between a primary winding and a secondary winding.

An exemplary embodiment of disclosure provides a cooled transformer coil and a cooled transformer, in which the coolant is guided to those areas of the turns which are thermally and highly loaded.

According to an exemplary embodiment of the disclosure, a transformer coil including a primary winding and a secondary winding has a heat pipe for carrying thermal energy away. The windings are arranged along the winding axis of the transformer coil. A section of the heat pipe referred to as an evaporator can be arranged in the area of the windings. By its shape, the evaporator can form at least one extensive evaporator segment, which extends in a circumferential direction of the windings along a winding axis and can cover a multiplicity of turns of the secondary winding.

Both the primary winding and the secondary winding have a plurality of turns. The turns on the primary side can be arranged to have a large area because of a high current to be carried, corresponding to a wound-up ribbon. The width of each individual turn can correspond substantially to the entire length of the coil. In contrast, the secondary winding has a plurality of turns, which can be narrower than those on the primary side. The secondary winding can be produced from turns which are wound in a radial direction and an axial direction of the coil.

In this context, the term heat pipe can mean not only a physical embodiment of a heat exchanger in the form of a pipe but also its functional embodiment as a passively operating heat exchanger, which can have a hermetically encapsulated volume with a working medium, and in which the heat of evaporation absorbed in the evaporator can be emitted in the condenser, and the working medium can be condensed there.

The shape of the evaporator, which is formed from one or more evaporator elements, can be matched to the shape of the coil. This means that the evaporator elements, and therefore the evaporator, can have the same or similar shape as the transformer coil. For example, a cylindrical shape or forming at least segments of a cylinder. This can allow heat to be exchanged between the evaporator and the coil over the entire surface of the transformer coil. Because of the area extent of the evaporator, for example, its extent in the circumferential direction and along the coil axis, individual evaporator segments of the evaporator can cover a multiplicity of turns of the secondary winding along the coil winding axis. This can allow cooling in thermally highly stressed areas of the coil. The evaporator segment or segments can be or are closed in the area of the bottom. For example, the evaporator segment or segments can form an annular cylindrical vessel in which a liquid cooling medium can be collected. In this case, the evaporator segments can be surrounded by the secondary winding, or the secondary winding can be surrounded by the evaporator segments.

In exemplary embodiments, the evaporator segments can extend over all the windings along the winding axis. This can ensure that heat is exchanged uniformly with all the turns along the winding axis.

In exemplary embodiments, a plurality of evaporator segments can be connected to one another in an area of the evaporator bottom, such that the working medium can be collected in the bottom area of the cylindrical evaporator, and can circulate through all the evaporator segments.

In exemplary embodiments, a plurality of evaporator elements can be connected to one another in the area of the evaporator outlet, such that at least one evaporator outlet is formed. The evaporator outlet can produce the connection to the condenser for the heat pipe.

In exemplary embodiments, the evaporator can be arranged within the turn having the smallest turn diameter, or between two turns of the primary winding. Thus can result in cooling of the coil in the immediate vicinity of the coil core or of the primary winding, and allowing the evaporator to be wound during production.

In exemplary embodiments, the evaporator can be arranged between the primary winding and the secondary winding. Thus can result in cooling and an improvement in the dielectric strength between the primary winding and the secondary winding.

In an exemplary embodiment, the evaporator surrounds the turn of the secondary winding having the largest turn diameter. Thus can result in optimum cooling of the turns on the secondary side, and can simplify the production of a coolable coil by the sheathing of the secondary winding.

An exemplary embodiment of a method according to the disclosure for production of a transformer coil can include formation of a plurality of turns of the primary winding, which can be composed of alternate layers of electrical insulating material and electrically conductive layer material. These layers can be wound around a central winding axis. A plurality of turns of the secondary winding can be wound around the winding axis. The turns of the secondary winding can then be sheathed by a hollow body composed of deformable material. The turns of the secondary winding and the hollow body can then be encapsulated by a casting resin. This can stabilize the shape of the hollow body which forms the evaporator of the heat pipe. The casting resin is cured, forming a block. The block including the secondary winding and the sheathing hollow body can then be arranged around the wound primary winding. The handling and design of the hollow body can be, for example, comparable to the principle of an air-filled mattress. In order to form the evaporator from the hollow body, the hollow body is filled with a gas or a liquid, and can be matched as appropriate to the shape of the transformer coil, by bending. The shape of the evaporator can therefore be matched to virtually any desired shape or any desired size of the coil former to be sheathed. The production process no longer requires a hollow body to be specially and additionally manufactured in accordance with the respective dimensions of the transformer coil. Instead, the method can be simplified in that the deformable material for the hollow body is cut to a length of the circumference of the respective coil, the material is filled, for example, with air, and the coil is sheathed with the air-filled material.

In an exemplary embodiment of a production method according to the disclosure, once the casting resin has been cured, walls of the evaporator formed from the deformable material can be dissolved by a solvent which can be introduced. The dissolving of the evaporator material can allow the working medium then to circulate freely around the coil core between the secondary coil and the casting resin which surrounds the secondary coil. This can result in heat being transferred directly from the coil to the working medium. This can further improve the cooling power in the coil. In an exemplary embodiment of a method according to the disclosure, the hollow body which is surrounded by the casting resin can be dissolved by heat. Dissolving by heat can make it possible to carry out the method steps of curing and dissolving of the hollow body in a single method step.

FIG. 1 shows a schematic view of an exemplary embodiment of a resin-encapsulated dry transformer coil 1 according to the disclosure which can be cooled by a heat pipe 10 and has a core 2 which is part of a transformer. The primary windings 3 and the secondary windings 4 are wound on the cylindrical transformer core 2, and the heat pipe 10 is embedded between them. Alternate layers including insulating layers 6, 7, 8, for example, polyester, and turns 301, 302 of the primary winding 3 are wound on the transformer core 2. The turns 301, 302 of the primary winding 3 extend along the winding axis 5 of the transformer coil 1 and over an entire length of the transformer coil 1, for example, more than one meter. As shown in FIG. 1, the coil 1 has a first and a second primary winding 301, 302 but depending on the configuration, can also have any other number of turns, for example, 3, 4, 5, 6 or more. Aluminum foils with an exemplary wall thickness of about (e.g., ±10%) 1 to 3 mm can be used for the primary winding 3. In exemplary embodiments, copper can be used as a material for the primary winding 3.

The heat pipe 10 essentially (e.g., substantially, such as greater than 50%) has a hollow-cylindrical evaporator 12, whose shape can be matched to the shape of the innermost turn 401 of the secondary winding 4. Thus can result in optimum heat transfer in the dry transformer. The evaporator can therefore be annular and concentric with respect to the winding axis 5.

The working medium 11 circulates in the interior of the evaporator 12. The evaporator 12 opens into an evaporator outlet 13 at the upper end of the coil 1. This evaporator outlet 13 connects the evaporator 12 to a condenser, for the heat pipe 10. In the condenser, the evaporating working medium can spread out and is condensed after heat emission. For mechanical decoupling, or in order to place the condenser at a point remote from the evaporator 12, a flexible section, for example, a corrugated ballast, can be inserted between the evaporator 12 and the condenser. The heat pipe 10 therefore can extend at least partially over the dimensions of the transformer coil 1, and therefore beyond the dimensions of the dry transformer.

The evaporator outlet 13 between the evaporator and the condenser can extend along a subarea of the evaporator circumference. In an exemplary embodiment, the evaporator output 13 can also extend over a larger area of the evaporator circumference, and can occupy the entire circumference.

The turns 401, 402 of the secondary winding 4 can be wound directly onto the heat pipe 10. Thin aluminum foils with a wall thickness of, for example, about 0.5 mm can be used as the turn material. For dielectric reasons, the heat pipe 10 is composed of electrically insulating material, which can have high thermal conductivity. The structure including the wound secondary winding 4 and the heat pipe 10 can be encapsulated by a vacuum encapsulation process in epoxy resin to form a block. After encapsulation and curing, the encapsulated block, including the secondary winding 4 and the heat pipe 10, can be arranged around the core 2 and the primary winding 3 of the coil 1. In this way, the dry transformer coil 1 can be cooled by a single heat pipe 10 and can assist the dissipation of heat particularly effectively in the internal area of the coil 1 between the primary winding 3 and the secondary winding 4.

The dry transformer coil 1 illustrated in FIG. 2 is similar to the coil 1 in FIG. 1. In contrast, the heat pipe 10 illustrated in FIG. 2 makes direct thermal and electrical contact with the outer turn 302 of the primary winding 3. This can result in high thermal conductivity between the primary winding 3 and the heat pipe 10, with the heat which occurs in the primary winding 3 being optimally transmitted to the heat pipe 10. The evaporator 12 of the heat pipe 10 sheaths the turn 302 with the largest turn diameter in the primary winding 3. The metallic evaporator 12 is at the same electrical potential as the primary winding 3. The condenser 17 is separated from the evaporator by an insulating piece, in order to galvanically isolate the evaporator 12 and the condenser 17 of the heat pipe 10. The evaporator 12 has four evaporator intermediate spaces 15 which are in the form of slots and extend along the winding axis 5 of the coil 1. These evaporator intermediate spaces subdivide the evaporator 12 into a plurality of evaporator segments 16. Each evaporator segment 16 extends over all the turns 401, 402 of the secondary winding 4 in the direction of the winding axis.

The electrical isolation between the evaporator 12, which is at the same potential as the primary winding 3, and the secondary winding 4 can be achieved in this case by sheathing the evaporator with an insulating layer 6 of appropriate thickness. The secondary winding 4 is in turn encapsulated in epoxy resin 14 by a vacuum casting method. In an exemplary embodiment, the dielectric strength between the evaporator and the secondary winding 4 can be achieved by the inside of the epoxy resin encapsulation 14 having an appropriate thickness. In another exemplary embodiment, an additional air gap can be provided in order to achieve the dielectric strength between the primary winding 3 and the secondary winding 4, which is encapsulated in epoxy resin.

The heat pipe 10 shown in FIG. 3 for the transformer coil 1 has a plurality of evaporator intermediate spaces 15, which subdivide the evaporator 12 into evaporator segments 16. The extensive evaporator segments 16 can be connected to one another in the bottom area, which is shown as a first end of the evaporator segments 16, and therefore form a collecting trough for the working medium 11. The working medium 11 can circulate through all the evaporator segments 16 and can absorb the heat which occurs in the coil 1 over the entire coil length. The evaporator segments 16 can also be connected to one another in the area of their second ends, and merge there into two evaporator outlets 13. The hollow-cylindrical metallic evaporator is arranged around the coil core 2. The inner wall of the evaporator 12 can make direct thermal and electrical contact with the coil core 2. Because the core 2 is floating or grounded, there can be no need for an electrical isolating gap between the evaporator 12 and the condenser 17 of the heat pipe 10. Layers composed of insulating material 6, 7, 8 and turns 301, 302 of the primary winding 3 can be wound alternately onto the evaporator 12. The primary winding 3 is once again surrounded by the secondary winding 4, which is encapsulated in epoxy resin 14.

Figure 4:
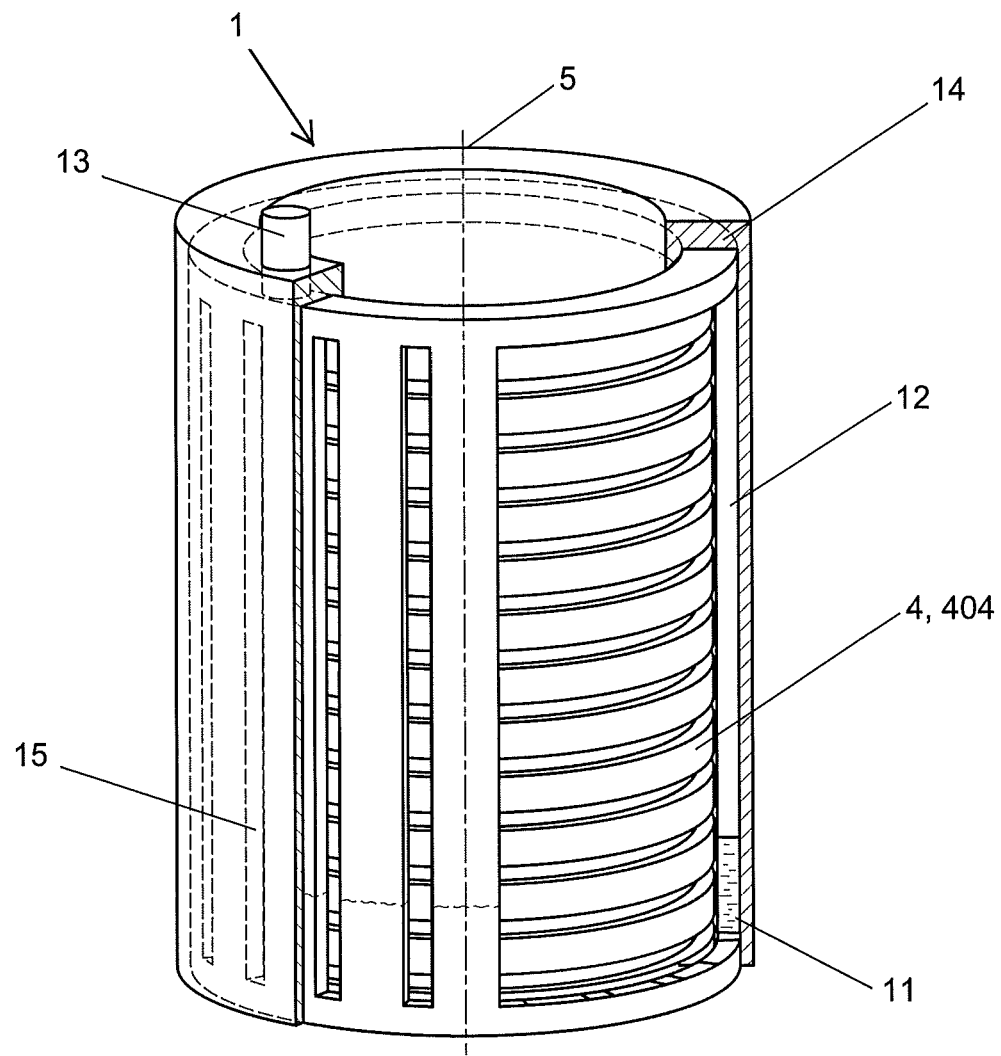
FIG. 4 shows a perspective view of an exemplary embodiment of a transformer coil with a heat pipe which is encapsulated in casting resin and is arranged on the outermost turn of the primary winding.

FIG. 4 shows an exemplary embodiment of a dry-type transformer coil 1 in which the heat pipe 10 is integrated in the secondary winding 4. The evaporator 12 of the heat pipe 10 has a plurality of evaporator segments 16, which form the cylindrically extended body of the evaporator 12, with the outer turns 402 of the secondary winding 4 being sheathed completely or, e.g., substantially, by the evaporator 12. In order to achieve thermal heat transmission between the secondary winding 4 and the evaporator 12, the evaporator 12 makes direct thermal contact with the secondary winding 4. Because the outer turns 404 are at a high-voltage potential, an electrically insulating material having high thermal conductivity can be chosen for the evaporator 12. The secondary winding 4 together with the sheathing heat pipe 10 can be encapsulated in epoxy resin 14 to form a block. The evaporator outlet 13 can be formed by a tubular connecting step, which forms the junction to the condenser of the heat pipe 10. In a heat pipe 10 integrated in this way, good heat dissipation from the secondary winding 4 can be achieved, in particular from the outermost turns 402.

Figure 5:
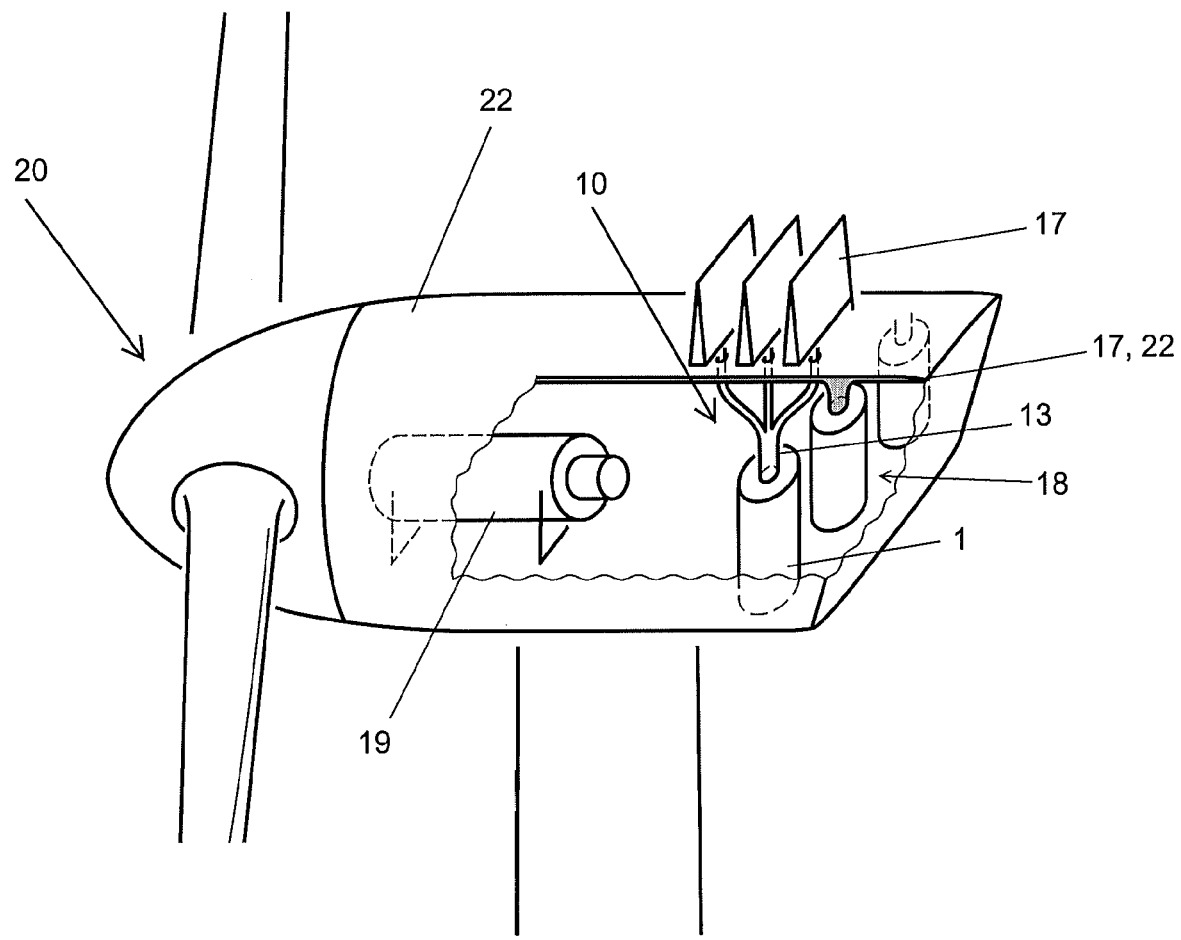
FIG. 5 shows a view of a wind power installation, in which the transformer coils according to an exemplary embodiment of the disclosure are arranged in a transformer in a nacelle of the wind power installation.

FIG. 5 shows the installation of a dry transformer 18, which can be cooled by three heat pipes 10, in a wind power installation 20. The power which is produced by the generator 19 is fed into the power supply system via the dry transformer 18. The transformer 18, which is accommodated in the nacelle 21 of the wind power installation 20, has three transformer coils 1, each of which has a respective heat pipe 10 with an evaporator 12, and the evaporator 12 can be integrated in the coil in the manner already described. Each of the three evaporator outlets 13 is connected to the respectively associated condenser 17 of the heat pipe 10. The condenser 17 of the first coil 1 has three cooling ribs, which are mounted outside the nacelle 21 on the roof of the nacelle 21. An exemplary embodiment of the second coil 1 is illustrated in FIG. 5. There, the evaporator outlet 13 opens into the roof part 22 of the nacelle 21, which is hollow and acts as a condenser 17. Large portions of the roof 22 can therefore also be used efficiently as a cooling surface for the condenser 17. As a result of the condenser 17 being provided outside the nacelle 21, or integrated in the roof 22 of the nacelle 21, the working medium 11 can be carried to the outside from the hermetically encapsulated internal area of the nacelle 21, and the evaporation heat can be emitted directly into the environment via the condenser 17. A wind power installation 20 designed in this way can have self-regulating cooling for the dry transformer 18. As the wind strength increases, an increasing amount of electrical power to be transmitted is fed into the power supply system via the transformer 18. At the same time, however, the wind also blows more strongly into the condenser 17, thus increasing the cooling power of the condenser 17. The cooling power is therefore automatically adapted to the power to be transmitted from the transformer 18. In the case of coolable transformers 18 designed in this way, high powers can be transmitted with the dry transformer 18 being small and physically compact, despite hermetic encapsulation by the nacelle 21, as is required, for example, for wind power installations 20 on the high seas. The design of the cooling for a dry transformer 18 designed in this way in a wind power installation 20 can be simplified in that only the evaporator outlet 13 now need be passed to the roof of the nacelle 21, or the evaporator outlet 13 just needs to be passed to the outside through the nacelle roof 22, making it possible to avoid complex cooling installations in the interior of the nacelle 21.

The disclosure has been described on the basis of use in a wind power installation 20. However, it can also be used, for example, a marine vessel or a train, such as where a dry transformer 18 with a high power density is installed in an environment which is hermetically shielded from the environment. When used, for example, in a marine vessel or in a train, the condenser 17 is guided appropriately to the surrounding train cladding or to the outer wall of the marine vessel, or is mounted outside the surrounding train cladding or the outer wall of the marine vessel. The condenser 17 can then be cooled by the wind of motion or, when used on the marine vessel, even by the water of motion flowing around.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Transformer coil
2 Core
3 Primary winding
301 First, inner turn of the primary winding
302 Second, outer turn of the primary winding
4 Secondary winding
401 First, inner turn of the secondary winding
402, 403 Turns of the secondary winding
404 Outer turn of the secondary winding
5 Winding axis of the transformer coil
6, 7, 8 Electrical insulating layers
10 Heat pipe
11 Working medium
12 Evaporator
13 Evaporator outlet
14 Epoxy resin encapsulation
15 Evaporator intermediate space
16 Evaporator segment
17 Condenser
18 Transformer
19 Generator
20 Wind power installation
21 Nacelle
22 Nacelle roof

What is claimed is:

1. A dry transformer coil, comprising:
a primary winding;
a secondary winding, the primary and second windings having turns;
a passively operating heat pipe for carrying thermal energy away from the transformer coil, a section of the heat pipe configured as an evaporator for evaporation of a working medium, arranged in an area of the windings; and
a winding axis along which the primary and second windings are arranged, wherein
the evaporator forms a plurality of extensive evaporator segments which hold a working medium, extend in a circumferential direction of the windings and along the winding axis and overlap with a plurality of the turns of the secondary winding, the evaporator segments being closed in a bottom area and being in a form of an annular cylindrical vessel, the evaporator segments being surrounded by the secondary winding, or the secondary winding being surrounded by the evaporator segments, wherein the plurality of extensive evaporator segments each have a first end and a second end, connected to one another in an area of their first ends, to form a collecting trough for the working medium and to allow circulation of the working medium through all the evaporator segments.

2. The transformer coil as claimed in claim 1, wherein the extensive evaporator segment covers at least one of: all the turns of the secondary winding and all the turns of the primary winding.

3. The transformer coil as claimed in claim 1, wherein the extensive evaporator segments are connected to one another in an area of their second ends to form at least one evaporator outlet for the working medium.

4. The transformer coil as claimed in claim 1, wherein the at least one extensive evaporator segment which forms the evaporator is at least one of annular and concentric with respect to the winding axis.

5. The transformer coil as claimed in claim 1, wherein the evaporator is arranged within a turn having a smallest turn diameter or between two turns of the primary winding.

6. The transformer coil as claimed in claim 1, wherein the evaporator is arranged between the primary winding and the secondary winding.

7. The transformer coil as claimed in claim 1, wherein the evaporator surrounds a turn of the secondary winding which has a largest turn diameter.

8. The transformer coil as claimed in claim 1, wherein the evaporator together with the secondary winding is encapsulated by a cast resin to form a block.

9. The transformer coil as claimed in claim 5, wherein the evaporator is formed from electrically insulating material and covers a potential gradient in the secondary windings.

10. The transformer coil as claimed in claim 1, wherein the evaporator is formed as an annular cylinder.

11. The transformer coil as claimed in claim 1, wherein the cylindrical evaporator has a total of 2 to N elongated evaporator intermediate spaces along the winding axis, thus forming 2 to N extensive evaporator segments.

12. A dry transformer, comprising:
a transformer coil, including:
a primary winding;
a secondary winding, the primary and second windings having turns;
a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms a plurality of extensive evaporator segments which hold a working medium, extend in a circumferential direction of the windings and along the winding axis and overlap with a plurality of the turns of the secondary winding, the evaporator segments being closed in a bottom area and being in a form of an annular cylindrical vessel, the evaporator segments being surrounded by the secondary winding, or the secondary winding being surrounded by the evaporator segments, wherein the plurality of extensive evaporator segments each have a first end and a second end, connected to one another in an area of their first ends, to form a collecting trough for the working medium and to allow circulation of the working medium through all the evaporator segments.

13. A wind power installation comprising: a nacelle having encapsulation with a dry transformer having a transformer coil including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator forms a plurality of extensive evaporator segments which hold a working medium, extend in a circumferential direction of the windings and along the winding axis and overlap with a plurality of the turns of the secondary winding, the evaporator segments being closed in a bottom area and being in a form of an annular cylindrical vessel, the evaporator segments being surrounded by the secondary winding, or the secondary winding being surrounded by the evaporator segment segments, wherein the plurality of extensive evaporator segments each have a first end and a second end, connected to one another in an area of their first ends, to form a collecting trough for the working medium and to allow circulation of the working medium through all the evaporator segments.

14. The wind power installation as claimed in claim 13, the heat pipe of the transformer comprising:
a condenser for condensation of the working medium, wherein the condenser is in close thermal contact with the encapsulation of the nacelle, such that the encapsulation forms a part of the condenser or has the function of cooling ribs, for carrying away thermal energy from the transformer to an environment via the encapsulation.

15. The wind power installation as claimed in claim 13, the heat pipe of the transformer comprising:
a condenser, the condenser extending outside the encapsulation of the nacelle in the form of a cooling rib arrangement which extends outside the encapsulation.

16. The wind power installation as claimed in claim 13, with the heat pipe of the transformer comprising:
a condenser, wherein the condenser is cooled by an air flow which runs in the nacelle.

17. A marine vessel, comprising: a dry transformer having a transformer coil including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and secondary windings are arranged, wherein the evaporator forms a plurality of extensive evaporator segments which hold a working medium, extend in a circumferential direction of the windings and along the winding axis and overlap with a plurality of the turns of the secondary winding, the evaporator segments being closed in a bottom area and being in a form of an annular cylindrical vessel, the evaporator segments being surrounded by the secondary winding, or the secondary winding being surrounded by the evaporator segments, wherein the plurality of extensive evaporator segments each have a first end and a second end, connected to one another in an area of their first ends, to form a collecting trough for the working medium and to allow circulation of the working medium through all the evaporator segments; and the heat pipe of the transformer having a condenser and the condenser being thermally coupled directly to the marine-vessel's wall or the marine-vessel's bottom.

18. A train, comprising: a dry transformer having a transformer including: a primary winding; a secondary winding, the primary and second windings having turns; a passively operating heat pipe for carrying thermal energy away from the transformer coil, a section of the heat pipe configured as an evaporator for evaporation of a working medium, arranged in an area of the windings; and a winding axis along which the primary and second windings are arranged, wherein the evaporator form a plurality of extensive evaporator segments which hold a working medium, extend in a circumferential direction of the windings and along the winding axis and cover a plurality of the turns of the secondary winding, the evaporator segments being closed in a bottom area and being in a form of an annular cylindrical vessel, the evaporator segments being surrounded by the secondary winding, or the secondary winding being surrounded by the evaporator segments, wherein the plurality of extensive evaporator segments each have a first end and a second end, connected to one another in an area of their first ends, to form a collecting trough for the working medium and to allow circulation of the working medium through all the evaporator segments; and the heat pipe has a condenser, the condenser extending outside cladding on the train, and being coolable by a wind of motion.

19. The transformer coil as claimed in claim 1, comprising:
an evaporator outlet for connecting the evaporator to a condenser.

* * * * *